United States Patent
Lacour

(10) Patent No.: US 9,579,985 B2
(45) Date of Patent: Feb. 28, 2017

(54) SYSTEM AND INSTALLATION FOR CHARGING AN ELECTRIC MOTOR VEHICLE

(71) Applicant: Conductix Wampfler France, Gennevilliers (FR)

(72) Inventor: Gilles Lacour, Belley (FR)

(73) Assignee: Conductix Wampfler France (FR)

(*) Notice: Subject to any disclaimer, the term of this patent is extended or adjusted under 35 U.S.C. 154(b) by 227 days.

(21) Appl. No.: 14/395,646

(22) PCT Filed: Apr. 25, 2013

(86) PCT No.: PCT/EP2013/058566
§ 371 (c)(1),
(2) Date: Oct. 20, 2014

(87) PCT Pub. No.: WO2013/160386
PCT Pub. Date: Oct. 31, 2013

(65) Prior Publication Data
US 2015/0097529 A1    Apr. 9, 2015

(30) Foreign Application Priority Data
Apr. 26, 2012 (FR) ...................... 12 53851

(51) Int. Cl.
*H01M 10/46* (2006.01)
*B60L 11/18* (2006.01)

(52) U.S. Cl.
CPC ....... *B60L 11/1816* (2013.01); *B60L 11/1818* (2013.01); *B60L 11/1825* (2013.01); *B60L 11/1827* (2013.01); *B60L 2230/12* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01)

(58) Field of Classification Search
CPC ...... H02J 7/355; H02J 7/0042; H01R 13/447; H01R 13/4538; H01R 13/5213
USPC ......... 320/104, 109, 111, 114, 115; 439/135, 439/141, 142
See application file for complete search history.

(56) References Cited

U.S. PATENT DOCUMENTS

| | | | |
|---|---|---|---|
| 5,431,264 A | 7/1995 | Tseng et al. | |
| 5,461,298 A | 10/1995 | Lara et al. | |
| 5,501,607 A * | 3/1996 | Yoshioka | B60K 1/04 439/142 |

(Continued)

FOREIGN PATENT DOCUMENTS

| | | |
|---|---|---|
| CH | 688598 A5 | 11/1997 |
| DE | 102009016895 A1 | 10/2010 |
| EP | 0630074 A2 | 12/1994 |

OTHER PUBLICATIONS

International Search Report for application No. PCT/EP2013/058566 dated May 29, 2013.

*Primary Examiner* — Edward Tso
(74) *Attorney, Agent, or Firm* — Ryan T. Grace; Advent, LLP

(57) ABSTRACT

The invention relates to a system for electrically coupling an electrical charging device to the power storage means of a vehicle. The system includes a bar, a protective panel, a flap, a drive means, and a control device for synchronizing the movements of the bar, protective panel, and flap between a stowed position and a position for extending from the ground.

19 Claims, 9 Drawing Sheets

(56) References Cited

U.S. PATENT DOCUMENTS

| | | |
|---|---|---|
| 5,523,666 A | 6/1996 | Hoelzl et al. |
| 5,850,135 A * | 12/1998 | Kuki .................. B60L 11/1805 320/108 |
| 6,265,261 B1 | 7/2001 | Kim et al. |
| 2011/0181240 A1 * | 7/2011 | Baarman ............... B60L 11/182 320/108 |

* cited by examiner

SYSTEM AND INSTALLATION FOR CHARGING AN ELECTRIC MOTOR VEHICLE

CROSS REFERENCE TO RELATED APPLICATIONS

The present application is a national phase entry under 35 U.S.C. §371 of International Application No. PCT/EP2013/058566, filed Apr. 25, 2013, published in French, which claims priority from French Patent Application No. 1253851, filed Apr. 26, 2012, the disclosures of which are incorporated by reference herein.

TECHNICAL FIELD

The present invention relates to the technical field of devices allowing charging/recharging of the electrical energy storage means of a vehicle including an electric motor.

PRIOR ART

Devices allowing recharging of the energy storage means of an electrically driven vehicle have already been developed.

One approach consists of equipping a vehicle with a power supply cord including, at one free end, a connector able to cooperate with a matching connector connected to an external source of electrical power. As a variant, the power supply cord is connected to the electrical source and is connected to a connector provided on the vehicle. This, however, requires that the user leave his vehicle to manually connect the electrical power source to the storage means using the cord. This is tedious and involves an electrocution hazard in the event of incorrect manipulation.

To correct this shortcoming, an electrical power supply device designed for an electrical vehicle is known from U.S. Pat. No. 6,265,261. This power supply device can be implemented on a rail placed on the ground connected to an electrical power source. To ensure precise positioning of the vehicle with respect to the rail, the device has, on the vehicle, an element in the shape of an inverted U, the side walls whereof are designed to be positioned on either side of the rail such that the inverted U-shaped element caps the rail. One shortcoming of this power supply device, however, is that it requires precise positioning of the vehicle with respect to the rail to allow the rail and the inverted-U element to be brought into contact.

Also known, from U.S. Pat. No. 5,461,298, is a power supply device using vehicle alignment information with respect to the electrical power source to allow precise docking of the vehicle to said power source. There too, the charging device requires precise positioning of the vehicle with respect to the electrical power source.

To compensate for this shortcoming, U.S. Pat. No. 5,523,666 proposes an electrical power supply device including a vehicle-side contact element designed to come into contact with a matching element positioned on the electrical power source. A transmitter on the vehicle allows transmission to the power source of data concerning the instantaneous height position of the contact element of the vehicle. Displacement means allow adjustment of the height of the matching power-source side element according to this information regarding the height of the contact element. This makes it possible to automatically adjust the heights of the contact element and of the matching element. One shortcoming of this power supply device, however, is that it only allows a height tolerance in positioning the vehicle.

To escape from constraints on positioning of the vehicle, U.S. Pat. No. 5,431,264 proposes a system for supplying electrical power by induction. This type system for supplying power by induction, however, has numerous shortcomings. In particular, a powerful electromagnetic field is generated to allow recharging of the vehicle. Such an electromagnetic field can, however, compromise the physical integrity of persons situated in proximity to the magnetic field.

One goal of the present invention is to propose an automatic coupling device for electrical energy storage means allowing the aforementioned shortcomings to be compensated.

Another goal of the present invention is to propose a secure coupling device that is more durable than prior art devices.

SUMMARY OF THE INVENTION

To this end, a system is proposed for electrically coupling an electrical charging device to energy storage means of an electrically driven motor vehicle, the system including:
  a support, embeddable, for example, inside an indentation made in the ground,
  at least one electrically conducting bar, the bar being capable of being electrically connected to the charging device,
  at least one protective panel for the indentation wherein is housed the embeddable support and capable of clearing a top opening of the support,
  at least one flap capable of protruding upward from the support to prevent objects from falling into said top opening,
  drive means capable of moving the bar, the protective panel and the flap:
    between a retracted position where:
      the bar and the flap are positioned within the indentation, and where
      the protective panel covers the indentation,
    and a position extending from the ground where:
      the bar and the flap extend at least partially outside the indentation, and where
      the protective panel protrudes from the ground,
  a control device for synchronizing the movements of the bar, the flap and the protective panel, the control device being designed to control the relative motion of the bar with respect to the protective panel when an opening formed between the flap and the protective panel is sufficient allow passage of said bar between the retracted position and the clearance position.

The presence of a flap, a panel and a plate, the movements whereof are synchronized by a control device, makes it possible to limit the risks of objects (gravel, branches, detritus, etc.) falling into the support. This solution can be implemented in environments where the aerial cable solution is not suitable, such as for example covered spaces. It also makes it possible to recharge vehicles of any height. Moreover, the proposed solution allows a great tolerance in positioning the vehicle with respect to the electrical contacts located in the ground.

Preferred but not limiting aspects of the system according to the invention are the following:
  the control device is designed to:

control the movement of the protective panel and of the flap so as to hold the protective panel in contact with the flap between the retracted position and an intermediate position, control the movement of the protective panel and of the flap so as to separate the protective panel from the flap between the intermediate position and the clearance position, the spacing between the protective panel and the flap constituting the opening for passage of the bar;

the control device is designed to:
control the movement of the flap in rotation about a first pivot connection between the retracted position and the intermediate position, and
control the movement of the flap in rotation about the first pivot connection and in rotation about a second pivot connection between the intermediate position and the clearance position;

the drive means include a single electric motor driving a shaft in rotation;

the protective panel is pivotally connected to the embeddable by a hinge extending along one edge of the indentation;

the protective panel includes an upper wall and two side walls perpendicular to the upper wall, the side walls extending inside the indentation in the retracted position and extending at least partially outside the indentation in the clearance position;

the control device includes a bent connecting rod:
pivotally connected to the protective panel at one of its ends, and
pivotally connected to the drive means at its other end;

the bent connecting rod is pivotally linked to the drive means through an arm that is fixed to the drive means, the system also including a releasable locking element for:
on the one hand, fastening the arm to the drive means, and
on the other hand, releasing the arm from the drive means when a crushing force applied to the protective panel exceeds a threshold value and the panel is not in its retracted position;

the locking element is a shear pin;

the arm and the bent connecting rod are arranged so that:
in the retracted position, the angle between the arm (9) and the vertical is comprised between about 0 and 20°, preferably between about 0 and 10°, and
in the clearance position, the angle between the arm (9) and the horizontal is comprised between about 0 and 20°, preferably between about 0 and 10°;

the flap is pivotally linked to the protective panel, the control device including elastic means, such as a spring, for applying a force to the flap tending to separate it from the protective panel;

the control device also includes two connecting rods connected pivotally to the bar and to the protective panel;

the control device includes a stroke limiter to reduce the distance traveled by the bar between the retracted position and the clearance position;

the stroke limiter is so arranged that the distance traveled by the bar between the retracted and clearance position is less than the distance traveled by the protective panel between the retracted position and the clearance position;

the stroke limiter includes a central connecting rod pivotally connected to two lateral connecting rods at its two ends and pivotally connected to a tab fixed to the protective panel at a pivot connection located between the ends of the central connecting rod, the free end of one of the lateral connecting rods being pivotally connected to the bar and the free end of the other lateral connecting rod being pivotally connected to the embeddable support;

the bar is mounted on a base comprising elastic means exerting a force on the bar tending to separate the bar from the base;

the base also includes a sensor for detecting the bar coming into contact with a vehicle and to control stopping of the drive means when said contact is detected;

the sensor includes a stroke-end contactor for detecting a force exerted by the bar on the base tending to compress the elastic means and to control stopping of the drive means when said force exceeds a threshold.

The invention also relates to an installation for recharging electrically driven vehicles, notable in that it includes a vehicle parking area provided with a plurality of coupling systems having the above characteristics.

BRIEF DESCRIPTION OF THE FIGURES

Other features, goals and advantages of the present invention will also appear from the description that follows, which is purely illustrative and not limiting and must be read with reference to the appended drawings wherein:

FIGS. 1 to 8 are drawings illustrating to scale an embodiment of the coupling system. The person skilled in the art can thus deduce from these drawings the dimensions, shapes, positions and angles of the different parts comprising it as well as their interactions so as to implement the invention. The different elements illustrated in these figures are thus included in the description.

DETAILED DESCRIPTION OF PREFERRED EMBODIMENTS OF THE INVENTION

The invention will now be described in more detail with reference to the figures.

General Principle of the Invention

Figure 7:
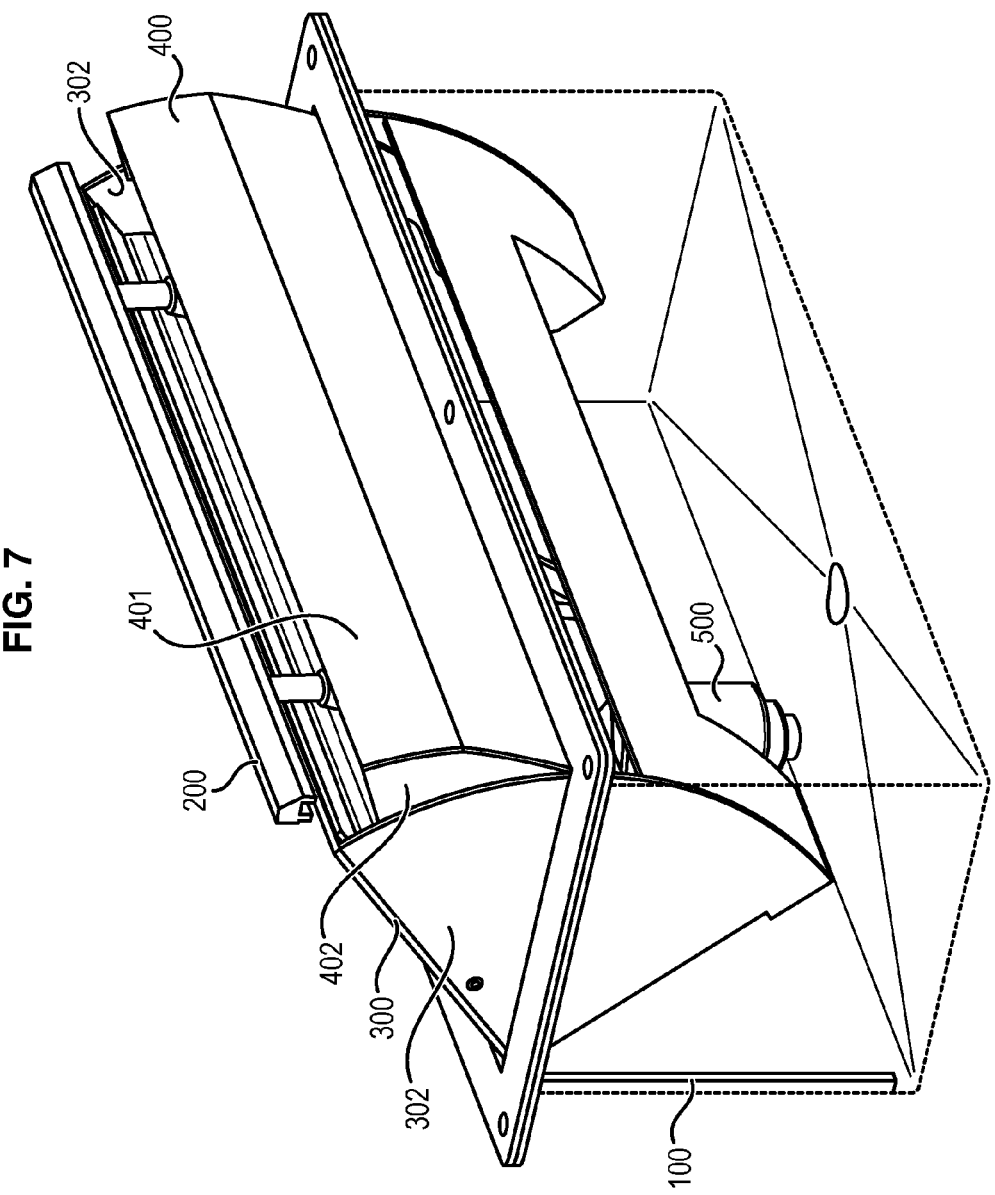
FIG. 7 is a transparency view of the coupling system in the clearance position.
Figure 8:
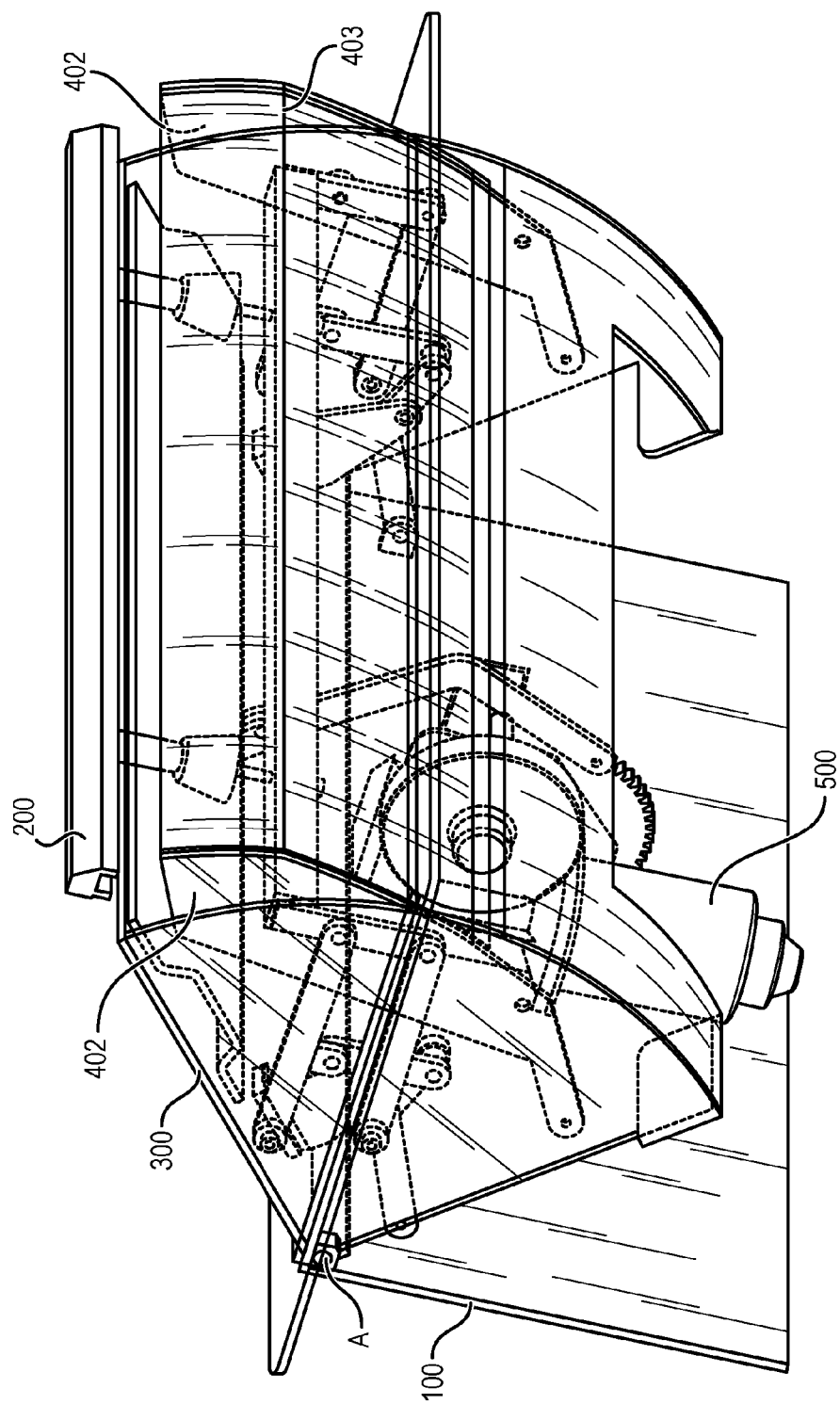
FIG. 8 is a full view of the coupling system in the clearance position.
Figure 9:
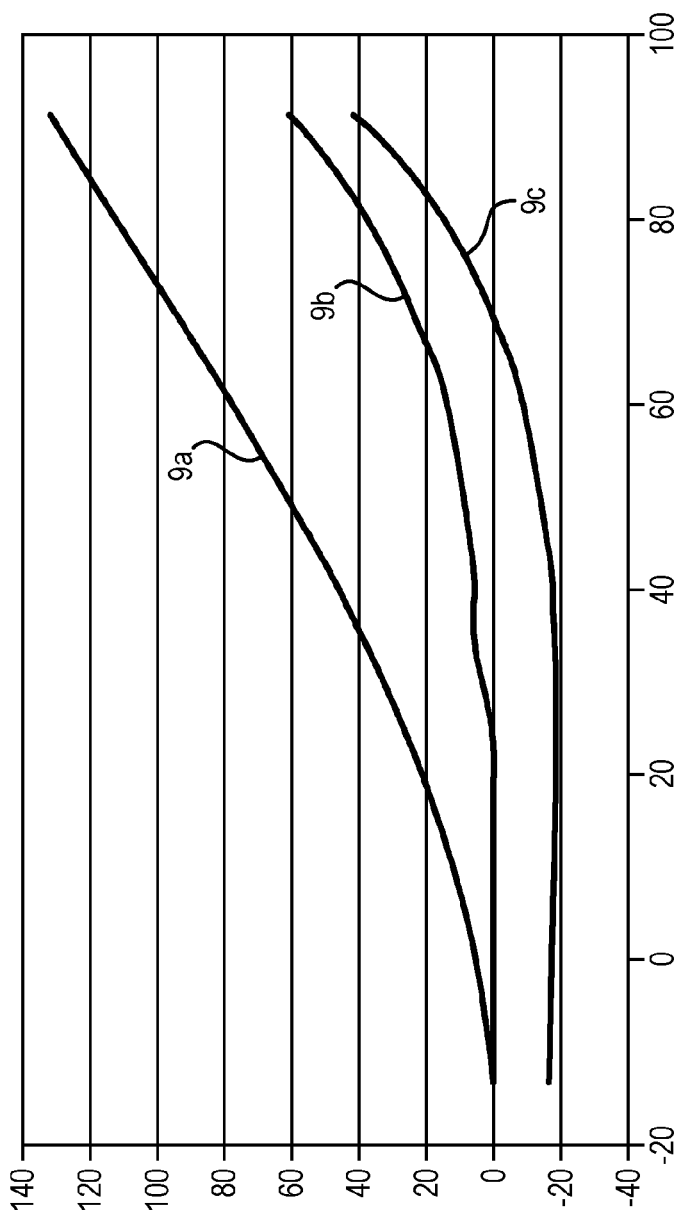
FIG. 9 illustrates a curve representing the distance between the flap and the ground, the relative distance between the bar and the flap and the width of an opening as a function of time.

With reference to FIGS. 7 and 9, the embodiment of an electric coupling system allowing an electrical charging device to be electrically connected to energy storage means of an electrically driven motor vehicle is illustrated.

This coupling system allows electrical charging of an electric vehicle from underneath the vehicle.

The coupling system including the following main elements: a support 100, a conducting bar 200, a panel 300 and a flap 400, drive means 500 and a control device.

Embeddable Support

The support 100 can be embedded in an indentation made in the ground. The support is rectangular for example and consists of four partitions and a bottom designed to accommodate the elements constituting the coupling system. It is fixed to the ground by a sole plate extending peripherally to the outside in its upper region.

Electrically Conducting Plate

The bar 200 is electrically conducting. This bar 200 is electrically connected to the charging device.

The bar 200 is designed to come into contact with another electrically conducting bar positioned underneath the vehicle and connected to the electrical storage assemblies to be electrically charged (typically batteries).

The bar 200 is fixed to a base 1 which can consist of two rods extending perpendicularly to the vehicle bar at its ends.

Protective Panel

The panel 300 allows protection of the indentation wherein is housed the embeddable support 100 when the coupling system is in the retracted position. More precisely, the panel 300 makes it possible to protect the elements of the coupling system housed in the support 100 when no vehicle is above it.

The panel 300 includes an upper wall 301 designed to cap the embeddable support.

The panel 300 also includes two side walls 302 extending perpendicularly to the upper wall 301 on first and second opposite edges thereof.

The protective panel 300 is mounted pivoting about a hinge A fixed to the support 100 and extending along a third edge of the upper wall 301.

This makes it possible for the panel to open at a fourth edge of the upper wall 301.

Flap

The flap 400 makes it possible to prevent objects from falling into the embeddable support.

The flap 400 extends within the embeddable support. In includes a front wall 401 extending within the support 100 at the fourth edge of the upper wall 300 of the protective panel 301.

In the retracted position, the upper edge of the front wall 401 is in contact with the fourth edge of the upper wall of the protective panel 300.

The opening allowing passage of the bar 200 forms between this upper edge and the fourth edge during movement of the panel 300 and of the flap 400 to pass from the retracted position into the clearance position.

The front wall 401 consists of two concave faces 404, 405 with the same radius of curvature. These faces 404, 405 are interconnected at a concave ridge 406 in such a way that the centers of the osculating circles of the two concave faces 404, 405 are remote from one another.

The flap 400 also includes two side walls extending on either side of the front wall 401, parallel to the side walls 302 of the protective panel 300.

The walls on the side 402 of the flap 400 are pivotally mounted on the side walls 302 of the protective panel 300. This allows rotational motion of the flap 400 relative to the panel 300 about an axis 402302.

Drive Means

The drive means 500 allow movement of the bar 200, of the protective panel 300 and of the flap 400 between a retracted position and a clearance position.

In the retracted position, the bar 200 and the flap 400 are positioned in the indentation, and the protective panel 300 covers the indentation.

In the clearance position, the bar 200 and the flap 400 extend at least partially outside the indentation, and the protective panel 300 protrudes from the ground.

The drive means 500 include for example three cylinders. A first cylinder allows movement of the bar 200. A second cylinder allows movement of the panel 300. A third cylinder allows movement of the flap 400.

As a variant, the drive means can include three motors associated respectively with the bar 200, the panel 300 and the flap 400. The use of electric motors makes it possible to obtain a torque without shocks, unlike cylinders. Moreover, the use of motors makes it possible to develop high power in a small volume.

As another variant, the drive means can include a single motor. The use of a single motor allows the volume of the coupling system to be limited.

Control Device

The control device makes it possible to synchronize the movements of the bar 200, of the panel 300 and of the flap 400 to move from the retracted position to the clearance position.

In the case of a coupling system including three cylinders or three motors, the control device can be a microcontroller.

In the case of a coupling system including a single motor, the control device can include a mechanical transmission as described in more detail hereafter with reference to FIGS. 1 through 6.

In any case, the control device is designed to control the relative movement of the bar 200 with respect to the protective panel 300 as soon as an opening between the protective panel 300 and the flap 400 is sufficient to allow passage of the bar 200.

This makes it possible to optimize the kinematics of movements of the bar, the panel and the flap.

Figure 3:
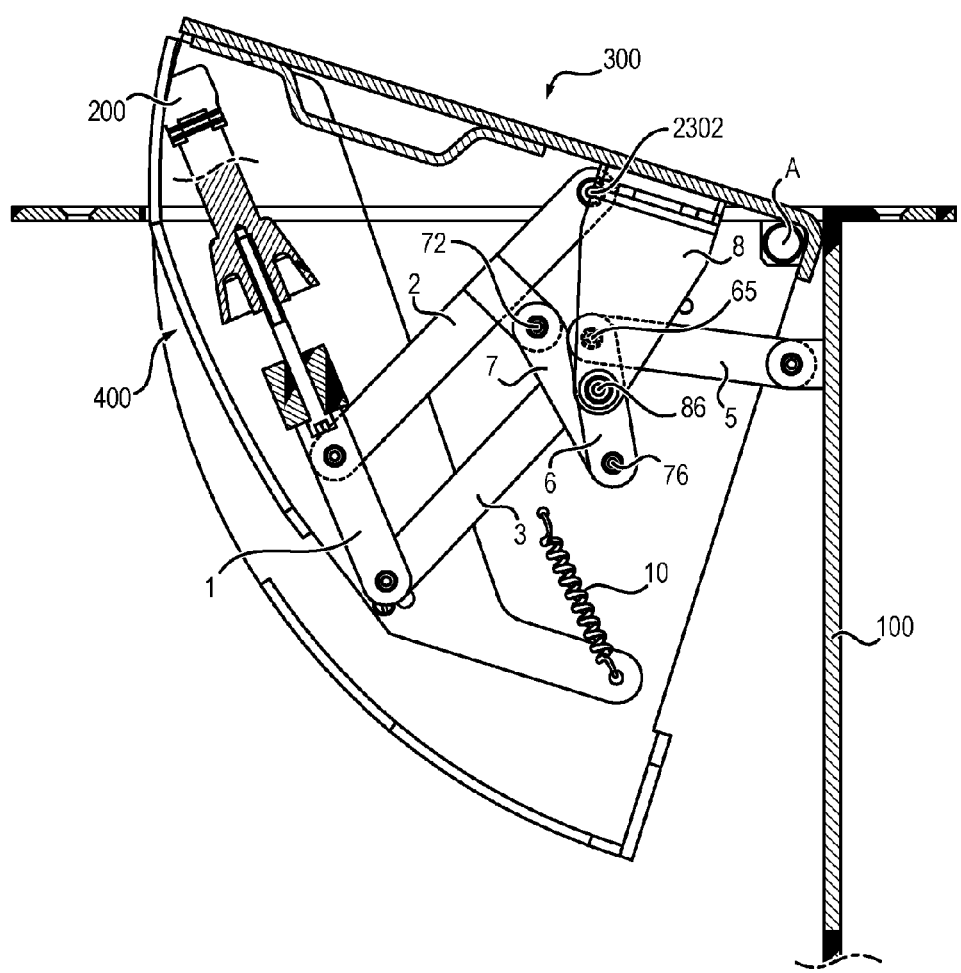
FIG. 3 is a side view of the coupling system in an intermediate position.
Figure 4:
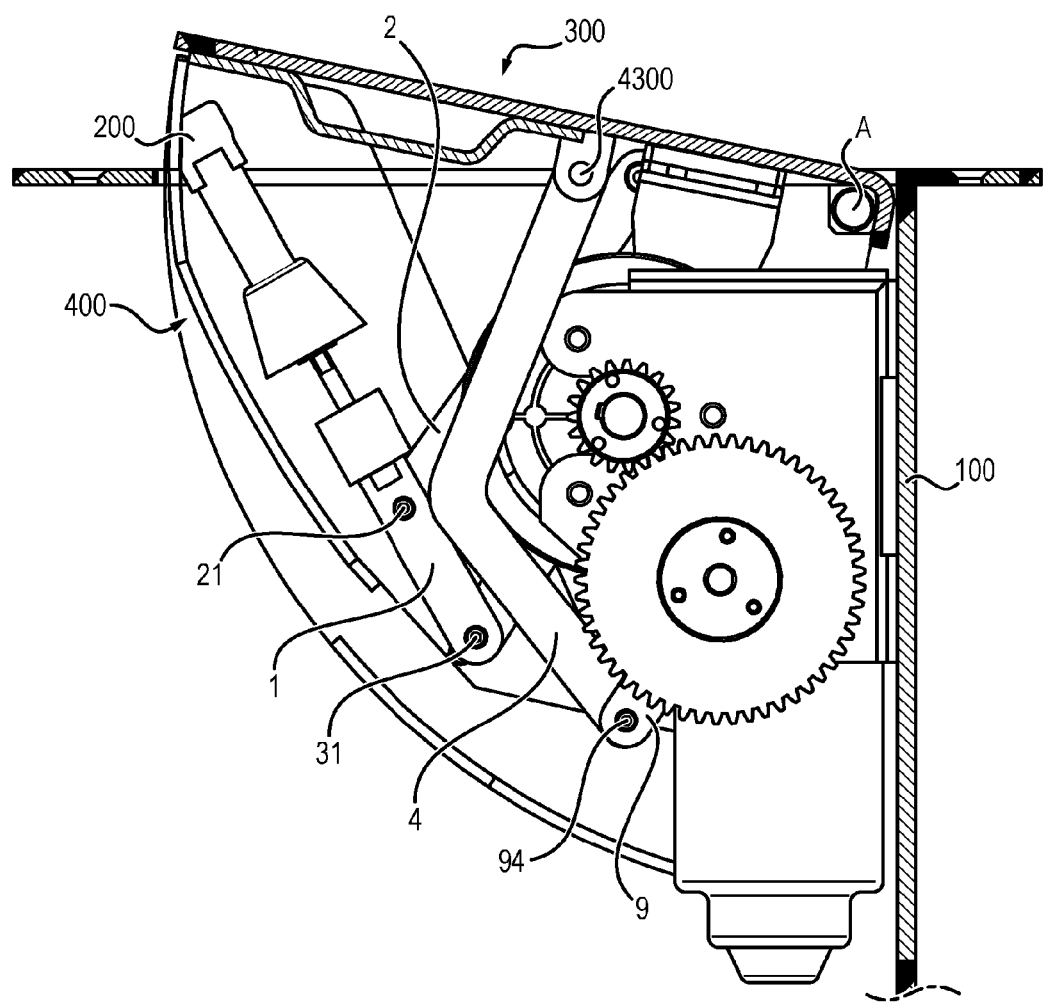
FIG. 4 illustrates a side [view] of the coupling system illustrating a bent connecting rod of a control device of the coupling system.
Figure 5:
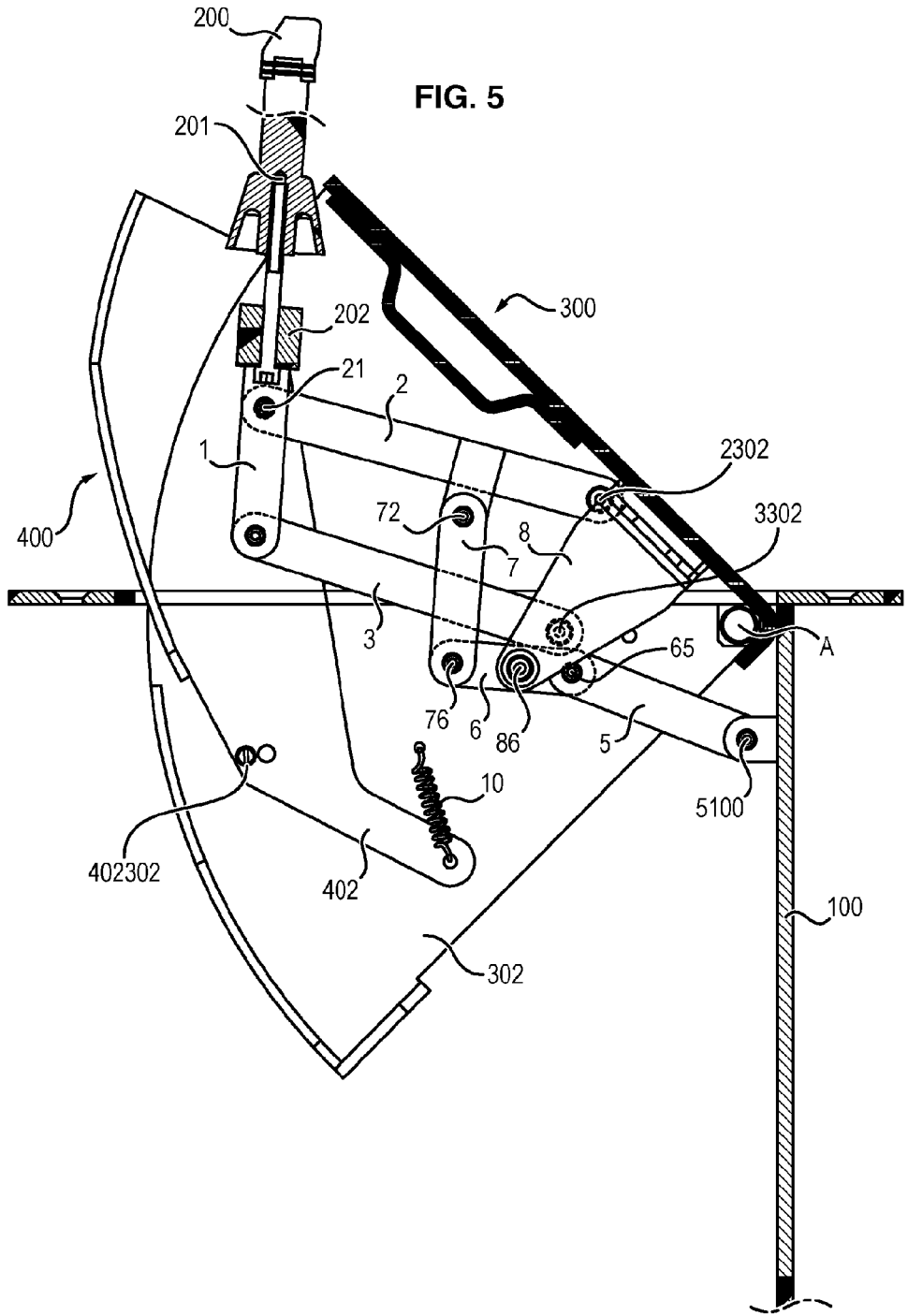
FIGS. 5 and 6 are side views of the coupling system in a clearance position.
Figure 6:
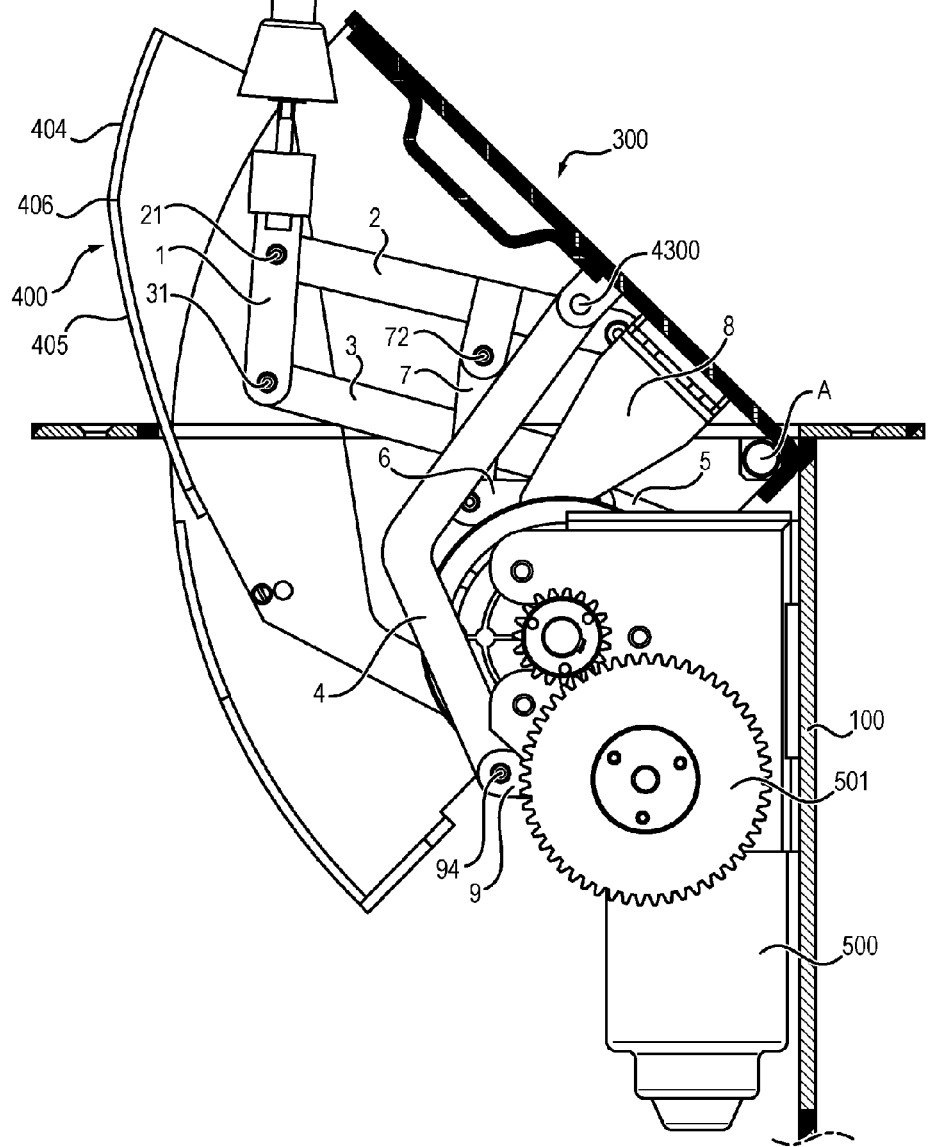

In one embodiment, the control device is designed to:
control the movement of the protective panel 300 and of the flap 400 so as to keep the protective panel 300 in contact with the flap 400 between the retracted position and an intermediate position illustrated in FIG. 3,
control the movement of the protective panel 300 and of the flap 400 so as to separate the protective panel 300 from the flap 400 between the intermediate position and the clearance position.

Thus, the opening between the protective panel 300 and the flap 400 only forms when they extend sufficiently outside the support 100. This makes it possible to avoid objects (gravel, detritus, etc.) falling inside the support 100 during deployment of the bar 200.

Preferably, the control device is designed to:
control the movement of the flap 400 in rotation between the retracted position and the intermediate position, and
control the movement of the flap (400) in rotation and in translation between the intermediate position and the clearance position.

The general operating principle of the coupling system will now be described with reference to FIG. 9, which is a graphic representation illustrating:
the distance as a function of time between the ground and the fourth edge of the upper wall of the protective panel (curve 9a),
the relative distance between the bar and the fourth edge of the upper wall of the protective panel (curve 9b), the distance (or separation) between the upper edge of the front wall of the flap and the fourth edge of the upper wall of the protective panel (curve 9b).

It is assumed that the coupling system is in the retracted position at time t=0. The protective panel 300 covers the embeddable support 100 and the side walls of the panel are inside the support. The bar 200 and the flap 400 are retracted, that is they extend inside the embeddable support 100.

The drive means 500 are activated. The power produced by the drive means 500 is transmitted to the bar 200, to the panel 300 and to the flap 400.

The upper wall 301 and the side walls 302 of the panel 300 pivot about the hinge A in such a manner that the fourth edge moves away from the ground and the side walls extend partially outside the support, thus avoiding the risk of falling objects at the first and second edges of the protective panel 300. Starting from the intermediate position, the flap moves in translation relative to the panel 300. The upper edge of the flap 400 moves away from the fourth edge of the panel 300. An opening forms: the bar 200 moves relative to the fourth edge to come into contact with an electrically conducting bar arranged underneath a vehicle.

Between the retracted position and the intermediate position, the distance between the ground and the fourth edge of the upper wall increases (curve 9a), while the separation between the upper edge of the flap and the fourth edge of the panel remains nil (curve 9b), and the distance between the bar and the panel remains constant (curve 9c).

Between the intermediate position and the clearance position, the distance between the ground and the fourth edge of the upper wall increases (curve 9a), the separation between the upper edge of the flap 400 and the fourth edge of the panel 300 increases (curve 9b), and the distance between the bar 200 and the panel 300 increases (curve 9c).

Exemplary Embodiment

With reference to FIGS. 1 through 6, an embodiment of the coupling system has been illustrated wherein the drive means include a single motor.

In this embodiment, the control device provides a dual function. On the one hand, it allows synchronization of the movements of the bar 200, of the panel 300 and of the flap 400, and on the other hand transmission of the power produced by the motor to the bar 200, to the panel 300 and to the flap 400 to allow their movement between the retracted position and the clearance position.

The control device includes a bent connecting rod 4. The bent connecting rod allows transmission to the panel of the power generated by the motor, while minimizing the volume of the system. The bent connecting rod 4 is linked pivotally to the panel 300 at one of its ends 4300. The other end of the bent connecting rod is mounted pivotally on the motor at a pivot connection 94.

More precisely, the bent connecting rod 4 is connected to the transmission means through an arm 9 fastened to the transmission means, particularly a gear train fixed to the motor shaft.

Preferably, the arm 9 is fixed to the motor using a releasable locking element 501 such as a shear pin. The fact that the locking element is releasable makes it possible to release the arm 9 of the motor when a crushing force applied to the panel 300 exceeds a threshold value and the panel is not in the retracted position.

For example, if the panel 300 is in the clearance position and a vehicle rolls over it, then the force applied to the panel induces the application of an equivalent force to the pin. Under the influence of this force, the pin shears, thus detaching the control device from the motor. This causes a rapid fall of the bar 200, of the panel 300 and of the flap 400 into the support 100, making it possible to avoid degradation of the system.

Figure 1:
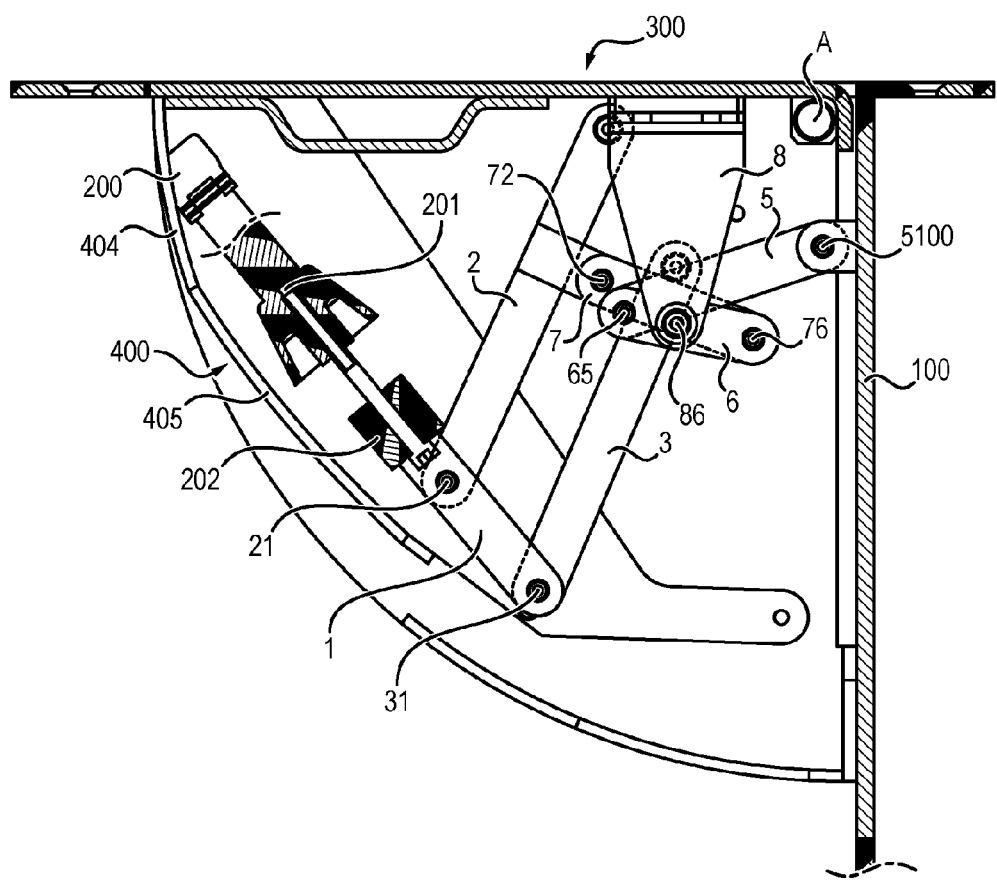
FIGS. 1 and 2 are side views of a coupling system in a retracted position.
Figure 2:
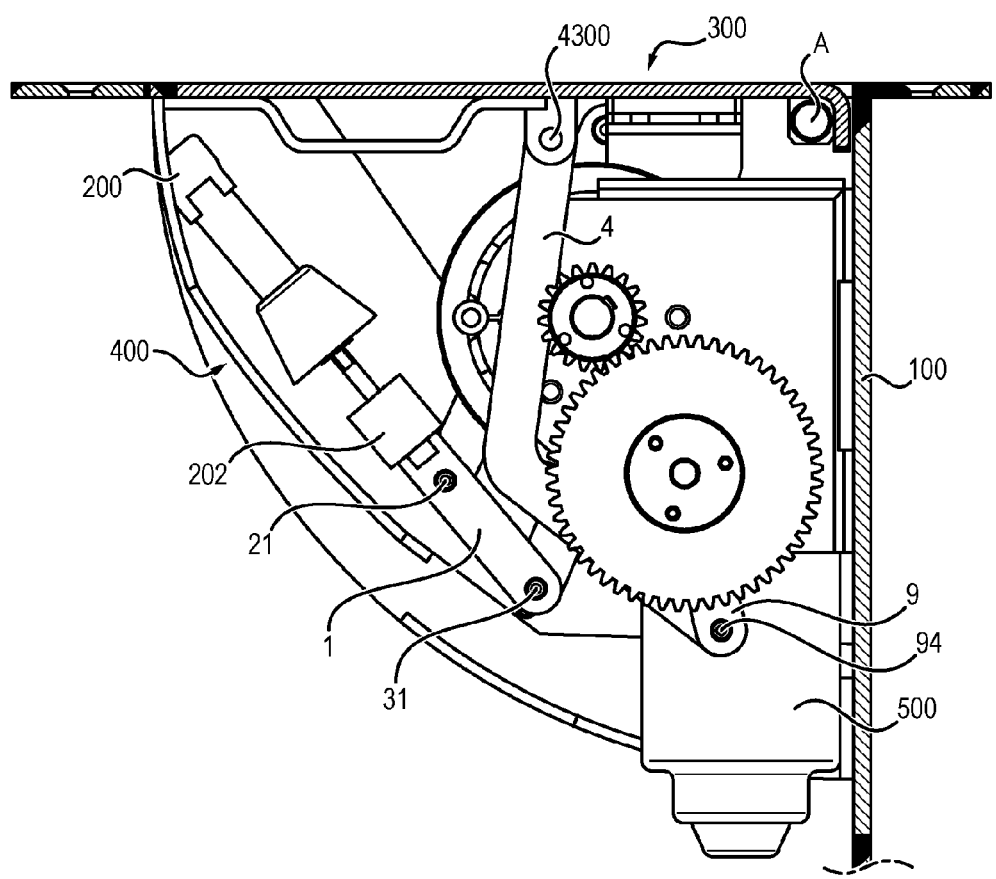

As shown in FIGS. 1 and 3, the arm 9 and the bent connecting rod 4 can be arranged in such a manner that in the retracted position, the angle between the arm 9 and the vertical is comprised between 0 and 20°, preferably between 0 and 10°. This makes it possible to avoid the risk of shearing the pin when the bar, the panel and the flap are in the retracted position.

The arm 9 and the bent connecting rod 4 can be arranged so that, in the clearance position, the angle between the arm 9 and the horizontal is comprised between 0 and 20°, preferably between 0 and 10°. This makes it possible to facilitate shearing of the pin when the bar, the panel and the flap are in the clearance position.

The control device also includes elastic means for applying a force on the flap 400 tending to separate it from the protective panel 300. These elastic means make it possible to induce a rotary motion of the flap relative to the panel about the pivot axis 402302.

The elastic means are for example a spring connected:
to the flap at one of its ends,
to the support by its other end.

The control device can also include two connecting rods 2, 3. These connecting rods 2, 3 are pivotally linked to the base of the bar 200 at two pivot connections 21, 31 and at one of the side walls 302 of the panel 300 at two pivot connection 2302, 3302. The connecting rods 2, 3 make it possible to ensure proper positioning of the bar during its movement into the clearance position.

Advantageously, the control device can also include a stroke limiter 5, 6, 7, 8. The stroke limiter makes it possible to reduce the distance traveled by the bar between the retracted position and the clearance position. By limiting the distance traveled by the bar, it is thus possible to reduce the volume of the system.

Indeed, the stroke limiter is arranged so that the distance traveled by the bar between the retracted position and the clearance position is less than the distance traveled by the protective panel between the retracted position and the clearance position. By reducing the amplitude of the movement of the bar between the extreme positions of the system, it is possible to reduce the volume of the support (and thus the volume of the system).

In the embodiment illustrated in FIG. 1 through 6, the stroke limiter includes a central connecting rod 6 and two lateral connecting rods 5, 7.

The central connecting rod is pivotally linked to two lateral connecting rods 5, 7 at its ends 65, 76. The central connecting rod 6 is also pivotally connected and pivotally connected to a tab 8 fastened to the protective panel at a pivot connection 86 located between the ends 65, 76 of the central connecting rod 6.

The free end 72 of one of the lateral connecting rods 7 is pivotally connected to the connecting rod 2 about a pivot connection 72. The free end 5100 of the other lateral connecting rod 5 is pivotally connected to the embeddable support 100.

Elastic means 201, such as a spring, can moreover be mounted on the device between the bar 200 and the base 1. These elastic means 201 exert a force on the bar 200 tending to separated it from the base 1. This makes it possible to ensure proper placement of the bar 200 on the bar of the electric vehicle when the bar is in the deployed position.

A sensor 202 can be provided at the base 1 of the coupling system. This sensor makes it possible to detect the bar 200 being brought into contact with the bar located underneath the vehicle. When the sensor detects the bar 200 coming into contact with the bar of the vehicle, it controls the deactivation of the motor so as to avoid deterioration of the device.

The sensor 202 can include an end-of-stroke contactor to detect a force exerted by the bar on the base tending to compress the elastic means and to control stopping of the drive means when said force exceeds a threshold.

Operating Principle

The operating principle of the coupling system illustrated in FIGS. 1 through 6 is the following.

In the retracted position (FIGS. 1 and 2), the bar 200 and the flap 400 are housed inside the support 100. The connecting rods 5, 6, 7 of the stroke limiter are substantially superposed such that the distance between the pivot connections 72 and 5100 is a minimum. The connecting rods 2, 3 have an angle comprised between 0 and 30°. The arm 9 connecting the motor to the bent connecting rod 4 has an angle comprised between 0 and −15°.

Upon activation of the motor, the arm 9 pivots about the transmission shaft of the motor. The bent connecting rod 4 moves, thus inducing movement of the panel 300. The flap pivotally connected to the panel moves simultaneously with the panel. The first face 404 slides along the wall of the support, preventing separation of the flap relative to the panel. Under the influence of the pull exerted by the tab 8, the central connecting rod 6 pivots about the connection 65 between connecting rods 5, and 6. The bar 200 also moves simultaneously with the panel, so that the distance between the bar and the panel remains constant.

The bar, the panel and the flap pass through the intermediate position (FIG. 3). Once the peak of the flap 400 protrudes from the ground, the flap 400 pivots relative to the panel about the pivot connection 402302, the spring 10 exerting a pull on the spring tending to separate it from the panel. The upper edge of the flap 400 separates from the fourth edge of the panel: an opening forms for passage of the bar.

Once the central connecting rod 6 has passed through the vertical, movement of the central connecting rod 6 induces a movement of the bar, the movement of the bar increasing as the connecting rods 5, 6, 7 extend.

The table below gives by way of indication the values of:
the distance between the ground and the fourth edge of the panel,
the distance between the bar and the fourth edge of the panel,
the opening corresponding to the separation between the upper edge of the flap and the fourth edge of the panel.
as a function of the angular displacement of the gear train fixed to the transmission shaft of the motor.

| | distance | | |
|---|---|---|---|
| gear angle | panel/ground | relative bar/panel | opening |
| −13.27 | 0 | −16.52 | 0 |
| 1.19 | 5.88 | −17.4 | 0 |
| 12.16 | 13.81 | −18.2 | 0 |
| 14.64 | 16 | −18.35 | 0 |
| 18.31 | 19.5 | −18.54 | 0 |
| 23.19 | 24.61 | −18.68 | 0 |
| 28.83 | 31.16 | −18.62 | 2.5 |
| 33.93 | 37.65 | −18.29 | 5.45 |
| 38.56 | 43.94 | −17.69 | 5.77 |
| 43.93 | 51.73 | −16.53 | 6.45 |
| 59.96 | 77.4 | −8.82 | 13.66 |
| 67.14 | 89.73 | −2.56 | 20.63 |
| 73.67 | 101.16 | 5.1 | 28.34 |
| 82.07 | 115.9 | 18.52 | 40.93 |
| 88.74 | 127.4 | 33.65 | 54.27 |
| 91.29 | 131.71 | 41.67 | 60.58 |

It is deduced from this table that the opening only forms when the distance between the ground and the fourth edge of the panel is greater than about 24 centimeters in the present example. This makes it possible to limit the risk of objects (detritus, gravel, etc.) falling into the support during transition from the retracted position into the clearance position.

It is also deduced from this table that the distance between the bar and the panel remains substantially constant between the angles of about 13° (retracted position) and about 43°, called the second intermediate position. Starting from the second intermediate position, a slight angular displacement of the motor gear train induces a considerable increase in the distance between the bar and the panel.

Numerous modifications can be applied to the present invention. For example, the coupling system can include a single mechanical unit incorporating both conductive bars (or more) and an insulating element separating the bars so as to define two distinct conductive portions, each portion being electrically connected to a terminal of an electrical power source.

The invention claimed is:

1. System for electrically coupling an electrical charging device to electrical energy storage means of an electrically driven motor vehicle, the system including:
   a support embeddable in an indentation made in the ground;
   at least one electrically conductive bar, the bar being capable of being electrically connected to the charging device;
   at least one panel for protecting the indentation wherein the embeddable support is housed and capable of clearing an upper opening of the support;
   at least one flap capable of extending upward from the support to prevent objects from falling into said upper opening;
   drive means, capable of moving the bar, the protective panel and the flap:
      between a retracted position where:
         the bar and the flap are positioned inside the indentation, and where
         the protective panel covers the indentation
      and a clearance position where:
         the bar and the flap extend at least partially outside the indentation and where
         the protective panel protrudes from the ground
   a control device to synchronize the movements of the bar, the flap and the protective panel, the control device being designed to control the relative movement of the bar with respect to the protective panel when an opening formed between the flap and the protective panel is sufficient to allow passage of said bar between retracted position and the clearance position.

2. The system according to claim 1, wherein the control device is designed to:

control the movement of the protective panel and of the flap so as to hold the protective panel in contact with the flap between the retracted position and an intermediate position, control the movement of the protective panel and of the flap so as to separate the protective panel from the flap between the intermediate position and the clearance position, the separation between the protective panel and the flap forming the opening for passage of the bar.

3. The system according to claim 2, wherein the control device is designed to:

control the movement of the flap in rotation about a first pivot connection between the retracted position and the intermediate position; and control the movement of the flap in rotation about the first pivot connection and in rotation about a second pivot connection between an intermediate position and the clearance position.

4. The system according to claim 1, wherein the drive means include a single electric motor driving a shaft in rotation.

5. The system according to claim 1, wherein the protective panel is connected pivotally to the embeddable support by a hinge extending along one edge of the indentation.

6. The system according to claim 1, wherein the protective panel includes an upper wall and two side walls perpendicular to the upper wall, the side walls extending inside the indentation in the retracted position and extending at least partially outside the indentation in the clearance position.

7. The system according to claim 1, wherein the control device includes a bent connecting rod:

pivotally connected to the protective panel at one of its ends; and pivotally connected to the drive means at its other end.

8. The system according to claim 7, wherein the bent connecting rod is pivotally connected to the drive means through an arm fastened to the drive mans, the system also including a releasable locking element to:

on the one hand, fasten the arm to the drive means; and on the other hand, to release the arm from the drive means when a crushing force applied to the protective panel exceeds a threshold value and the panel is not in the retracted position.

9. The system according to claim 8, wherein the releasable locking element is a shear pin.

10. The system according to claim 8, wherein the arm and the bent connecting rod are arranged so that:

in the retracted position, the angle between the arm and the vertical is comprised between about 0 and 20°, preferably between 0 and 10°; and in the clearance position, the angle between the arm and the horizontal is comprised between about 0 and 20°, preferably between about 0 and 10°.

11. The system according to claim 1, wherein the flap is pivotally connected to the protective panel, the control device including elastic means such as a spring, for applying a force to the flap tending to separate it from the protective panel.

12. The system according to claim 1, wherein the control device also has two connecting rods pivotally connected to the bar and to the protective panel.

13. The system according to claim 1, wherein the control device includes a stroke limiter to reduce the distance travelled by the bar between the retracted position and the clearance position.

14. The system according to claim 13, wherein the stroke limiter is arranged so that the distance travelled by the bar between the retracted position and the clearance position is less than the distance travelled by the protective panel between the retracted position and the clearance position.

15. The system according to claim 13, wherein the stroke limiter includes a central connecting rod pivotally connected to two lateral connecting rods at its two ends and pivotally connected to a tab fastened to the protective panel at a pivot connection located between the ends of the central connecting rod, the free end of one of the lateral connecting rods being pivotally connected to the bar and the free end of the other lateral connecting rod being pivotally connected to the embeddable support.

16. The system according to claim 1, wherein the bar is mounted on a base comprising elastic means exerting a force on the bar tending to separate the bar from the base.

17. The system according to claim 16, wherein the base further includes a sensor for detecting the bar coming into contact with a vehicle and to control stopping of the drive means when said coming into contact is detected.

18. The system according to claim 17, wherein the sensor includes an end-of-stroke detector for detecting a force exerted by the bar on the base tending to compress the elastic means and for controlling the stopping of the drive means said force exceeds a threshold.

19. An installation for recharging electrically driven vehicles, wherein it includes a vehicle parking area provided with a plurality of systems for electrically coupling an electrical charging device to electrical energy storage means of an electrically driven motor vehicle, each system including:

a support in an indentation made in the ground;

at least one electrically conductive bar, the bar being capable of being electrically connected to the charging device;

at least one panel for protecting the indentation wherein the embeddable support is housed and capable of clearing an upper opening of the support;

at least one flap capable of extending upward from the support to prevent objects from falling into said upper opening, drive means, capable of moving the bar, the protective panel and the flap:

between a retracted position where:

the bar and the flap are positioned inside the indentation, and where the protective panel covers the indentation and a clearance position where:

the bar and the flap extend at least partially outside the indentation and where the protective panel protrudes from the ground a control device to synchronize the movements of the bar, the flap and the protective panel, the control device being designed to control the relative movement of the bar with respect to the protective panel when an opening formed between the flap and the protective panel is sufficient to allow passage of said bar between the retracted position and the clearance position.

* * * * *